(12) United States Patent
Ho et al.

(10) Patent No.: US 10,954,329 B2
(45) Date of Patent: Mar. 23, 2021

(54) MODIFIED COPOLYMER, METHOD FOR PREPARING THE SAME, AND METHOD FOR PREPARING PASTE

(71) Applicant: INDUSTRIAL TECHNOLOGY RESEARCH INSTITUTE, Hsinchu (TW)

(72) Inventors: Shou-Yi Ho, New Taipei (TW); Kuo-Chan Chiou, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 99 days.

(21) Appl. No.: 16/232,581

(22) Filed: Dec. 26, 2018

(65) Prior Publication Data

US 2020/0095357 A1 Mar. 26, 2020

(30) Foreign Application Priority Data

Sep. 25, 2018 (TW) .................... 107133605

(51) Int. Cl.
| | |
|---|---|
| *C08F 267/10* | (2006.01) |
| *C08F 212/08* | (2006.01) |
| *C08F 220/70* | (2006.01) |
| *C08J 5/18* | (2006.01) |
| *C08K 3/04* | (2006.01) |

(52) U.S. Cl.
CPC .......... *C08F 220/70* (2013.01); *C08F 212/08* (2013.01); *C08J 5/18* (2013.01); *C08K 3/042* (2017.05); *C08J 2325/08* (2013.01); *C08J 2333/24* (2013.01)

(58) Field of Classification Search
CPC .... C08F 267/10; C08F 212/08; C08F 220/70; C08L 25/18; C08J 2333/24; C08J 2325/08

See application file for complete search history.

(56) References Cited

U.S. PATENT DOCUMENTS

| | | | |
|---|---|---|---|
| 4,931,510 A | 6/1990 | Sackmann et al. | |
| 6,562,428 B1 | 5/2003 | Ohrui | |
| 7,078,464 B2 | 7/2006 | Schmidhauser et al. | |
| 7,365,108 B2 | 4/2008 | McGorrin et al. | |
| 9,238,733 B2 | 1/2016 | Li et al. | |
| 2005/0014868 A1 | 1/2005 | Rasmusen et al. | |
| 2009/0026425 A1 | 1/2009 | Satou et al. | |
| 2016/0160067 A1 | 6/2016 | Xia et al. | |
| 2020/0064736 A1* | 2/2020 | Yang | G03F 7/085 |

FOREIGN PATENT DOCUMENTS

| | | |
|---|---|---|
| CN | 107045243 A | 8/2017 |
| JP | 2000-319333 A | 11/2000 |
| TW | 200829658 A | 7/2006 |
| TW | 201008961 A1 | 3/2010 |
| TW | 201623710 A | 7/2016 |

OTHER PUBLICATIONS

Taiwanese Office Action and Search Report, dated Aug. 26, 2019, for Taiwanese Application No. 107133605.

\* cited by examiner

*Primary Examiner* — Karuna P Reddy
(74) *Attorney, Agent, or Firm* — Birch, Stewart, Kolasch & Birch, LLP (57) ABSTRACT

A modified copolymer is provided. The modified copolymer includes a random copolymer of a repeat unit of formula (I) and a repeat unit of formula (II)

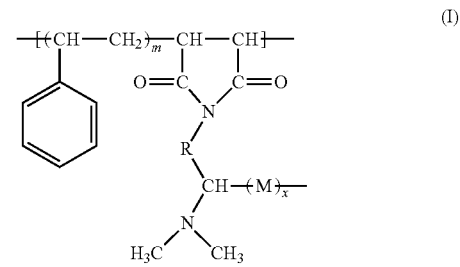

(I)

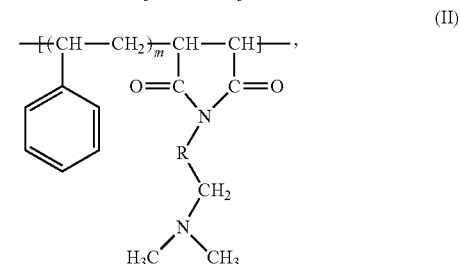

(II)

wherein M is derived from monomers with double bonds, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups, wherein m and x are positive integers less than 50. The weight average molecular weight of the modified copolymer is between 3000 and 30000.

25 Claims, 3 Drawing Sheets

MODIFIED COPOLYMER, METHOD FOR PREPARING THE SAME, AND METHOD FOR PREPARING PASTE

CROSS REFERENCE TO RELATED APPLICATIONS

This application claims priority of Taiwan Patent Application No. 107133605, filed on Sep. 25, 2018, the entirety of which is incorporated by reference herein.

TECHNICAL FIELD

The technical field relates to a modified copolymer, a method for preparing the same, and a method for preparing paste.

BACKGROUND

Carbon paste is used to make black paste, black matrix of display frame, antistatic coating, and conductive carbon paste. In the material of the black paste and the display frame, in order to obtain a paste with stability, blackness and high optical density, a surface-modified carbon black is mostly used to increase the dispersibility and added amount thereof in resin. In comparison with precious metals, using carbon material as filler can effectively reduce costs by increasing electrical conductivity. For achieving the requirement of low resistivity and passing a reliability test, the superconductive carbon black (such as Evonik XE2B or carbon BP2000), which has an intact surface structure and a high surface area, is used as filler. The superconductive carbon black, however, is not apt to uniformly disperse in the resin, since the superconductive carbon black does not have polar functional groups.

In order to maintain the adhesion and hardness of the carbon film, it is particularly important to select an appropriate dispersant. At present, most of the dispersant are oligomers, but the oligomer has no polymerizable functional groups and has relative low molecular weight. When mixing with the resin and curing to form a solid film, the oligomer will degrade the properties (such as adhesion and hardness) of the cured film. In addition, using styrene-maleimide copolymer as a dispersant, the adhesion and hardness of the carbon film formed by curing the carbon paste are also reduced.

Therefore, a novel dispersant is still called for.

SUMMARY

According to an embodiment of the disclosure, the disclosure provides a modified copolymer. The modified copolymer is a random copolymer including a repeat unit of Formula (I) and a repeat unit of Formula (II)

(I)

(II)

wherein, M is derived from monomers with double bonds, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups, m and x are positive integers less than 50, and the weight average molecular weight of the modified copolymer is between 3000 and 30000.

According to another embodiment of the disclosure, the disclosure provides a method for preparing the modified copolymer. The method includes mixing a copolymer of Formula (V), a monomer having a double bond, an initiator, and a solvent to form a prepolymer; and irradiating the prepolymer with an ultraviolet light to undergo a grafting reaction. The weight ratio of the copolymer of Formula (V) to the monomer is from 6:1 to 1:6

(V)

wherein a is a positive integer less than 50; b is an integer from 5 to 25; R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups; and the polymer of formula (V) has a weight average molecular weight between 2000 and 6000.

According to another embodiment of the disclosure, the disclosure provides a method for preparing a paste. The method includes mixing the modified copolymer, a compound with a double bond or a polymer with a double bond and a carbon material to form a paste. The ratio of the modified copolymer to the compound with a double bond or the polymer with a double bond is from 9:1 to 1:9.

A detailed description is given in the following embodiments with reference to the accompanying drawings.

DETAILED DESCRIPTION

As used herein, the singular form "a", "an" and "the" include plural references unless the context clearly dictates otherwise. For example, the term "a compound" or "at least one compound" may include a plurality of compounds, including mixtures thereof.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

The disclosure provides a modified copolymer, and the modified copolymer can serve as a dispersant in order to increase the dispersibility of the pigment (such as carbon black or graphite). For pigment formulations with different polarities, the length and polarity of the modified copolymer side chain can be adjusted to achieve the desired dispersion. In addition, the carbon film formed by curing the carbon paste has good adhesion and hardness.

In an embodiment of the disclosure, a modified copolymer is provided. The modified copolymer is a random copolymer including a repeat unit of Formula (I) and a repeat unit of Formula (II)

wherein M is derived from monomers with double bonds, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups, m and x are positive integers less than 50, and modified copolymer has a weight average molecular weight between 3000 and 30000. In some embodiments of the disclosure, R can be direct bond, straight or branched $C_1$-$C_{12}$ alkyl group, cycloalkyl group, straight or branched alkoxy group, straight or branched acyl group, aryl group, straight or branched nitroalkyl group, ether group, ester group, keto group, azo group, or a combination thereof.

In some embodiments of the disclosure, R can be —$R_{13}$—$(CH_2)_p$—, —$R_{14}$—O—$(CH_2)_p$—, —$R_{15}$—N—$(CH_2)_p$—, wherein $R_{13}$, $R_{14}$, and $R_{15}$ are independently straight or branched $C_1$-$C_{12}$ alkyl group, cycloalkyl group, phenyl group, benzyl group, imidazol group, benzimidazol group, 1,3,4-thiadiazole group, or pyridine group; and p is 0 or an integer from 1 to 12.

In some embodiments of the disclosure, the modified copolymer further includes a repeat unit of Formula (III) and/or repeat unit of Formula (IV), wherein M is derived from monomers with double bonds, R can be direct bond, an aliphatic hydrocarbon chain group having 1 to 1 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups. Further, m, y, z, and n are independent a positive integer less than 50. In some embodiments of the disclosure, R can be direct bond, straight or branched alkyl group having 1 to 10 carbon atoms, cycloalkyl group, straight or branched alkoxy group, straight or branched acyl group, aryl group, straight or branched nitroalkyl group, ether group, ester group, keto group, azo group, or a combination thereof.

In some embodiments of the disclosure, R can be —$R_{13}$—$(CH_2)_p$—, —$R_{14}$—O—(CH2)$_p$-, —$R_{15}$—N—$(CH_2)_p$—, wherein $R_{13}$, $R_{14}$, and $R_{15}$ are independently straight or branched $C_1$-$C_{12}$ alkyl group, cycloalkyl group, phenyl group, benzyl group, imidazol group, benzimidazol group, 1,3,4-thiadiazole group, or pyridine group; and p is 0 or an integer from 1 to 12.

In some embodiments of the disclosure, the repeat unit of Formula (I), the repeat unit of Formula (II), the repeat unit of Formula (III), and/or the repeat unit of Formula (IV) are arranged in a random fashion.

In some embodiments of the disclosure, the modified copolymer can be random copolymer including a repeat unit of Formula (I) and a repeat unit of Formula (II). In some embodiments of the disclosure, the modified copolymer is a random copolymer, which can further include a repeat unit of Formula (III). In some embodiments of the disclosure, the modified copolymer can further include a repeat unit of Formula (V). In some embodiments of the disclosure, the modified copolymer can further include a repeat unit of Formula (III), and a repeat unit of Formula (IV).

In some embodiments of the disclosure, M is a repeat unit of Formula (VI) which is derived from a monomer of Formula (VII):

wherein $R^8$, $R^9$, $R^{10}$, and $R^{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)O$R_3$, —C(=O)NH$R_4$, —O$R_5$, —NH$R_6$, —$R_7$COOH, or one of $R_8$ and $R_9$ and one of $R_{10}$ and $R_{11}$ link together with the carbon atoms to which $R_8$, $R_9$, $R_{10}$, and $R_{11}$ are attached to form $C_5$-$C_{12}$ cycloalkyl group or cycloalkenyl, wherein $R_3$, $R_4$, $R_5$ or $R_6$ are independently hydrogen, straight or branched $C_1$-$C_{12}$ alkyl group, $C_5$-$C_{12}$ cycloalkyl group, $C_2$-$C_8$ epoxy group, $C_6$-$C_{12}$ aryl group, $R_7$ is straight or branched $C_1$-$C_{12}$ alkyl group or straight or branched $C_1$-$C_{12}$ alkoxy group. In some embodiments of the disclosure, one of $R_8$, $R_9$, $R_{10}$, and $R_{11}$ can be dicyclopentadienyl group, oxetanyl group, or a derivative thereof.

In some embodiments of the disclosure, $R_3$, $R_4$, $R_5$ or $R_6$ can be wherein $R_{12}$ can be hydrogen, straight or branched $C_1$-$C_{12}$ alkyl group, $C_1$-$C_{12}$ straight or branched alkoxy group, straight or branched $C_1$-$C_{12}$ alkylamine group; p is an integer from 1 to 12; $R_{16}$ is straight or branched $C_1$-$C_{12}$ alkyl group, $R_{17}$ is hydrogen, straight or branched $C_1$-$C_{12}$ alkyl group, d is an integer from 1 to 600.

In some embodiments of the disclosure, the monomer can include dicyclopentenyloxyethyl acrylate, 3-ethyl-3-(methacryloyloxy)methyloxetane(3-ethyl-3-(methacryloyloxy) methyloxetane), 3,4-epoxycyclohexylmethyl acrylate, methoxy polyethylene glycol (550) monoacrylate (such as: CD553), alkoxylated lauryl acrylate (such as: CD9075), 2-(2-ethoxyethoxy) ethyl acrylate (such as: SR256), tetrahydrofurfuryl acrylate (such as: SR285), lauryl acrylate (such as: SR335), isodecyl acrylate (such as: SR395NS), 3,3,5-trimethylcyclohexyl acrylate (such as: SR420), isobornyl acrylate (such as: SR506NS), octyldecyl acrylate (such as: SR484), tridecyl acrylate (such as: SR489D), cyclic trimethylolpropane formal acrylate (such as: SR531), 2-hydroxyethyl acrylate, 2-ethylhexyl acrylate, vinylpyrrolidone, or a combination thereof.

Depending on the polarity of the pigment formulation, the monomer can be selected to adjust the polarity of the side chain of the modified copolymers, in order to obtain a modified copolymer, which is suitable for various pigment formulations.

In another embodiment of the disclosure, a method for preparing the modified copolymer is provided. The method includes mixing a copolymer of Formula (V)

a monomer having a double bond, an initiator, and a solvent to form a prepolymer; and irradiating the prepolymer with an ultraviolet light to undergo a grafting reaction.

In Formula (V), a is a positive integer less than 50; b is an integer from 5 to 25; R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups. The polymer of formula (V) has a weight average molecular weight between 2000 and 6000.

In some embodiments of the disclosure, polymer of formula (V) the weight ratio of the polymer of formula (V) to the monomer can be from 6:1 to 1:6. In some embodiments of the disclosure, the weight ratio of the polymer of formula (V) to the monomer can be from 6:1 to 2:5, such as 3:4. In some embodiments of the disclosure, the polymer of formula (V) can be styrene-maleimide copolymer.

In some embodiments of the disclosure, according to the polymer of formula (V), a can be a positive integer less than 50, b can be an integer from 5 to 25, and the polymer of formula (V) has a weight average molecular weight between 2000 and 6000.

In one embodiment of the disclosure, according to the polymer of formula (V), a is an integer from 1 to 30, b is an integer from 5 to 25, and the polymer of Formula (V) has a weight average molecular weight from 3500 to 4500.

In some embodiments of the disclosure, R can be —$R_{13}$—$(CH_2)_p$—, —$R_{14}$—O—$(CH2)_p$-, —$R_{15}$—N—$(CH_2)_p$—, wherein $R_{13}$, $R_{14}$, and $R_{15}$ are independently straight or branched $C_1$-$C_{12}$ alkyl group, cycloalkyl group, phenyl group, benzyl group, imidazol group, benzimidazol group, 1,3,4-thiadiazole group, or pyridine group; and p is 0 or an integer from 1 to 12.

In some embodiments of the disclosure, the monomer having a double bond can have a structure represented by Formula (VII):

(VII)

wherein $R^8$, $R^9$, $R^{10}$ and $R^{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)O$R_3$, —C(=O)NH$R_4$, —O$R_5$, —NH$R_6$, —$R_7$COOH, or one of $R_8$ and $R_9$ and one of $R_{10}$ and $R_{11}$ link together with the carbon atoms to which $R_8$, $R_9$, $R_{10}$, and $R_{11}$ are attached to form $C_5$-$C_{12}$ cycloalkyl group or cycloalkenyl; wherein $R_3$, $R_4$, $R_5$ or $R_6$ are independently hydrogen, straight or branched $C_1$-$C_{12}$ alkyl group, $C_5$-$C_{12}$ cycloalkyl group, $C_2$-$C_8$ alkoxy group, $C_6$-$C_{12}$ aryl group; $R_7$ is independently straight or branched $C_1$-$C_{12}$ alkyl group or straight or branched $C_1$-$C_{12}$ alkoxy group. In some embodiments of the disclosure, one of $R_8$, $R_9$, $R_{10}$, and $R_{11}$ can be dicyclopentadienyl group, oxetanyl group, or a derivative thereof.

In some embodiments of the disclosure, $R_3$, $R_4$, $R_5$ or $R_6$ can be wherein $R_{12}$ can be hydrogen, straight or branched $C_1$-$C_{12}$ alkyl group, $C_1$-$C_{12}$ straight or branched alkoxy group, straight or branched $C_1$-$C_{12}$ alkylamine group; p is an integer from 1 to 12; $R_{16}$ is straight or branched $C_1$-$C_{12}$ alkyl group; $R_{17}$ is hydrogen, straight or branched $C_1$-$C_{12}$ alkyl group; and d is an integer from 1 to 600.

In some embodiments of the disclosure, the monomer having a double bond can include dicyclopentenyloxyethyl acrylate, 3-ethyl-3-(methacryloyloxy)methyloxetane, 3,4-epoxycyclohexylmethyl acrylate, methoxy polyethylene glycol (550) monoacrylate, alkoxylated lauryl acrylate, 2-(2-ethoxyethoxy) ethyl acrylate, tetrahydrofurfuryl acrylate, lauryl acrylate, isodecyl acrylate, 3,3,5-trimethylcyclohexyl acrylate, isobornyl acrylate, isooctyl acrylate, tridecyl acrylate, cyclic trimethylolpropane formal acrylate, 2-hydroxyethyl acrylate, 2-ethylhexyl acrylate, vinylpyrrolidone, or a combination thereof.

Depending on the polarity of the pigment formulation, the monomer can be selected to adjust the polarity of the side chain of the modified copolymers, in order to obtain a modified copolymer, which is suitable for various pigment formulations.

In some embodiments of the disclosure, the initiator can include an azo compound, peroxide compound, type II photoinitiator, or a combination thereof.

In some embodiments of the disclosure, the azo compound can include 2,2'-azobis(2-methyl-propionitrile), 4,4'-azobis(4-cyanovaleric acid), 1,1'-azobis(cyclohexanecarbonitrile), or a combination thereof.

In some embodiments of the disclosure, the peroxide compound can include 2,2-bis(tert-butylperoxy)-butane, 1,1-bis(tert-butylperoxy)-cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, di-tert-butyl peroxide, tert-butyl peroxybenzoate, cyclohexanone peroxide, dicumyl peroxide, lauroyl peroxide, or a combination thereof.

In some embodiments of the disclosure, the type II photoinitiator can include anthraquinone, benzophenone, 4-benzoyl biphenyl, camphorquinone, 2-chlorothioxanthen-9-one, 4,4'-dihydroxybenzophenone, 2,5-dimethylbenzophenone, 3,4-dimethylbenzophenone, ethylanthraquinone, thioxanthen-9-one, isopropylthioxanthone (ITX), or a combination thereof.

In some embodiments of the disclosure, the solvent can include butyl carbitol acetate (butyl carbitol acetate; BCA), dibasic ester (DBE), γ-butyrolactone (GBL), methoxy propyl acetate (PMA), 1-methyl-2-pyrrolidone (NMP), dimethylacetamide (DMAc), or a combination thereof.

Next, the method for preparing the modified copolymer includes irradiating the prepolymer with an ultraviolet light to undergo a grafting reaction. In the presence of ultraviolet light and initiator, the tertiary amine on the side chain of the polymer of Formula (V) produces free radicals, and the monomer is reacted with the side chain of the polymer of Formula (V) via the double bond, thereby forming a grafting copolymer. Herein, the term "grafting copolymer" is also known as modified copolymer in the disclosure.

It should be noted that, after grafting, the dispersibility of the polymer of Formula (V) is increased due to the increased steric hindrance between carbon material.

At the same time, after grafting, the carbon material agglomerate would be destroyed under a low shear rate, thereby forming a carbon paste with lower viscosity. The method for preparing the carbon paste is disclosed below.

Furthermore, since the monomer, which is grafted with the polymer of Formula (V), has a highly relative functional group (such as epoxy group or oxetanyl group), the relative functional group can be reacted with resin to undergo a crosslinking reaction to increase the mechanical properties of curing product of carbon paste, when subjecting the carbon paste to a photo-curing process.

It should be noted that when the reactants (i.e. polymer of Formula (V), monomer having a double bond, initiator, and solvent) are mixed in the absence of ultraviolet light irradiation process, the polymer of Formula (V) would not react with the monomer to undergo a grafting reaction. As a result, the modified copolymer of the disclosure is not obtained.

In another embodiment of the disclosure, a method for preparing a paste is prepared. The method includes mixing the modified copolymer, a compound with a double bond or a polymer with a double bond and a carbon material to form a paste. The ratio of the modified copolymer to the compound with a double bond or the polymer with a double bond is from 9:1 to 1:9.

In some embodiments of the disclosure, the amount of modified copolymer is 100 parts by weight, the amount of compound with a double bond or the polymer with a double bond is 1-2000 parts by weight, and the amount of carbon material is 1-1000 parts by weight. In some embodiments of the disclosure, the amount of modified copolymer is 100 parts by weight, the amount of compound with a double bond or the polymer with a double bond is 20-900 parts by weight, and the amount of carbon material is 60-800 parts by weight. In some embodiments of the disclosure, the amount of modified copolymer is 100 parts by weight, the amount of compound with a double bond or the polymer with a double bond is 30-700 parts by weight, and the amount of carbon material is 80-600 parts by weight. In other embodiments of the disclosure, the amount of modified copolymer is 100 parts by weight, the amount of compound with a double bond or the polymer with a double bond is 50-650 parts by weight, and the amount of carbon material is 90-550 parts by weight.

In some embodiments of the disclosure, the monomer having a double bond can have a structure represented by Formula (VII):

(VII)

wherein $R^8$, $R^9$, $R^{10}$ and $R^{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)OR$_3$, —C(=O)NHR$_4$, —OR$_5$, —NHR$_6$, —R$_7$COOH, or one of R$_8$ and R$_9$ and one of R$_{10}$ and R$_{11}$ link together with the carbon atoms to which R$_8$, R$_9$, R$_{10}$, and R$_{11}$ are attached to form $C_5$-$C_{12}$ cycloalkyl group or cycloalkenyl; wherein R$_3$, R$_4$, R$_5$ or R$_6$ are independently hydrogen, straight or branched $C_1$-$C_{12}$ alkyl group, $C_5$-$C_{12}$ cycloalkyl group, $C_2$-$C_8$ alkoxy group, $C_6$-$C_{12}$ aryl group; R$_7$ is independently straight or branched $C_1$-$C_{12}$ alkyl group or straight or branched $C_1$-$C_{12}$ alkoxy group.

In some embodiments of the disclosure, one of R$_8$, R$_9$, R$_{10}$, and R$_{11}$ can be dicyclopentadienyl group, oxetanyl group, or a derivative thereof.

In some embodiments of the disclosure, R3, R4, R5 or R6 can be wherein $R_{12}$ can be hydrogen, straight or branched $C_1$-$C_{12}$ alkyl group, $C_1$-$C_{12}$ straight or branched alkoxy group, straight or branched $C_1$-$C_{12}$ $C_1$-$C_{12}$ alkylamine group; p is an integer from 1 to 12; $R_{16}$ is straight or branched $C_1$-$C_{12}$ alkyl group, $R_{17}$ is hydrogen, straight or branched $C_1$-$C_{12}$ alkyl group, d is an integer from 1 to 600.

In some embodiments of the disclosure, the compound with a double bond can include dicyclopentenyloxyethyl acrylate, 3-ethyl-3-(methacryloyloxy)methyloxetane, 3,4-epoxycyclohexylmethyl acrylate, methoxy polyethylene glycol (550) monoacrylate, alkoxylated lauryl acrylate, 2-(2-ethoxyethoxy) ethyl acrylate, tetrahydrofurfuryl acrylate, lauryl acrylate, isodecyl acrylate, 3,3,5-trimethylcyclohexyl acrylate, isobornyl acrylate, isooctyl acrylate, tridecyl acrylate, cyclic trimethylolpropane formal acrylate, 2-hydroxyethyl acrylate, 2-ethylhexyl acrylate, vinylpyrrolidone, or a combination thereof.

In some embodiments of the disclosure, the polymer with a double bond can be a resin. In some embodiments of the disclosure, the resin can include acrylic resin, polyester resin, fluorocarbon resin, polyamide resin, polyimide resin, polyether resin, epoxy resin, polyurethane resin, polystyrene resin (PS resin), polyvinyl butyral resin (PVB resin), silicone resin, phenoxy resin, urea resin, acrylonitrile-butadiene-styrene resin (ABS resin), polyacrylate resin, or a combination thereof. In some embodiments of the disclosure, the resin can include an oligomer with a double bond. In some embodiments of the disclosure, the resin can be replaced with the monomer. In some embodiments of the disclosure, the monomer can include a monomer as the same as the monomer which is used to prepare the copolymer.

In some embodiments of the disclosure, the carbon material can include carbon black, graphite, graphene, vapor-grown carbon fiber (vapor grown carbon fiber; VGCF), or a combination thereof. In some embodiments of the disclosure, the carbon black is a non-modified superconductive carbon black.

In some embodiments of the disclosure, after the addition of resin and carbon material into the modified copolymer, the components of the carbon paste can be uniformly dispersed among the carbon paste by means of a mixer, a three-roller (grinder), or other suitable device. As a result, the carbon paste is obtained.

The viscosity of the carbon paste is measured at various shear rates by rheometer. When the viscosity of the carbon paste is too high (such as greater than 100 Pa·S under the shear rate of 10 S$^{-1}$), the carbon paste is not suitable for use in the screen-printing process due to the low mobility. When the viscosity of the carbon paste is too low (such as greater than 2 Pa·S under the shear rate of 10 S$^{-1}$), the carbon paste is not suitable for use in the screen-printing process due to the high mobility.

By bonding the suitable monomer with the tertiary amine side chain of the polymer of Formula (V) via the grafting reaction, the obtained modified copolymer can serve as dispersant in order to increase the dispersibility of the pigment.

Furthermore, besides the conductivity, the carbon paste also exhibits low viscosity and improved screen printability. Meanwhile, the carbon film prepared from the carbon paste exhibits superior adhesion and hardness.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

Examples 1-6

The styrene-maleimide copolymer (model: SMA1000I, manufacturer: Sartomer), the monomer (model: 512AS, manufacturer: Hitachi Chemical Company, Ltd., dicyclopentenyloxyethyl acrylate), the initiator (model: ITX, manufacturer: Double Bond Chemical Ind., Co., Ltd., isopropylthioxanthone), and the solvent (BCA, butyl carbitol acetate) were mixed according to the ratios disclosed in Table 1 to form prepolymers. The prepolymers were irradiated with an ultraviolet light to undergo a grafting reaction, obtaining the modified copolymers.

Examples 7 and 8

The styrene-maleimide copolymer (SMA1000I), the monomer (model: 102, manufacturer: Changzhou Tronly New Electronic Materials Co., Ltd., 3-ethyl-3-(methacryloyloxy)methyloxetane), the initiator (ITX, isopropylthioxanthone), and the solvent (BCA, manufacturer: aldrish, butyl carbitol acetate) were mixed according to the ratios disclosed in Table 1 to form prepolymers. The prepolymers were irradiated with an ultraviolet light to undergo a grafting reaction, obtaining the modified copolymers.

Comparative Examples 1 and 2

The styrene-maleimide copolymer (SMA1000I), the monomer (512AS, dicyclopentenyloxyethyl acrylate), the initiator (ITX, isopropylthioxanthone), and the solvent (BCA, butyl carbitol acetate) were mixed according to the ratios disclosed in Table 2 to form mixtures, but the mixtures did not be irradiated with an ultraviolet light.

Comparative Examples 3 and 4

The styrene-maleimide copolymer (SMA1000I), the monomer (102, 3-ethyl-3-(methacryloyloxy)methyloxetane), the initiator (ITX, isopropylthioxanthone), and the solvent (BCA, butyl carbitol acetate) were mixed according to the ratios disclosed in Table 2 to form mixtures, but the mixtures did not be irradiated with an ultraviolet light.

Preparation of Carbon Paste

The resin (acrylic resin) and the carbon material (KS6 (graphite), manufacturer: Imerys Graphite & Carbon, and XE-2B (carbon black), manufacturer: Evonik Degussa) were added into the modified copolymer as disclosed in Examples 1-8 according to the ratios disclosed in Table 1. Next, the results were dispersed by three-roller to form carbon pastes.

The resin (acrylic resin) and the carbon material (KS6 (graphite) and XE-2B (carbon black)) were added into the modified copolymer as disclosed in Comparatives Examples 1-4 according to the ratios disclosed in Table 2. Next, the results were dispersed by three-roller to form carbon pastes.

The viscosity of the carbon pastes disclosed in Examples and Comparatives examples 1-4 were measured at various shear rates by rheometer. The results are shown in FIGS. 1-6.

Figure 1:
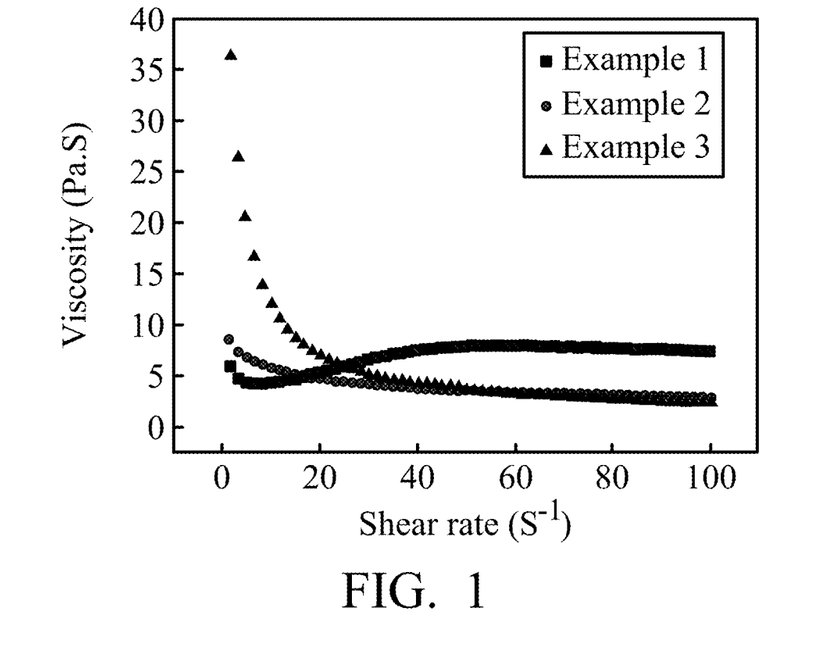
FIG. 1 is a graph plotting the viscosity of the carbon paste against shear rate according to Examples of the disclosure.
Figure 2:
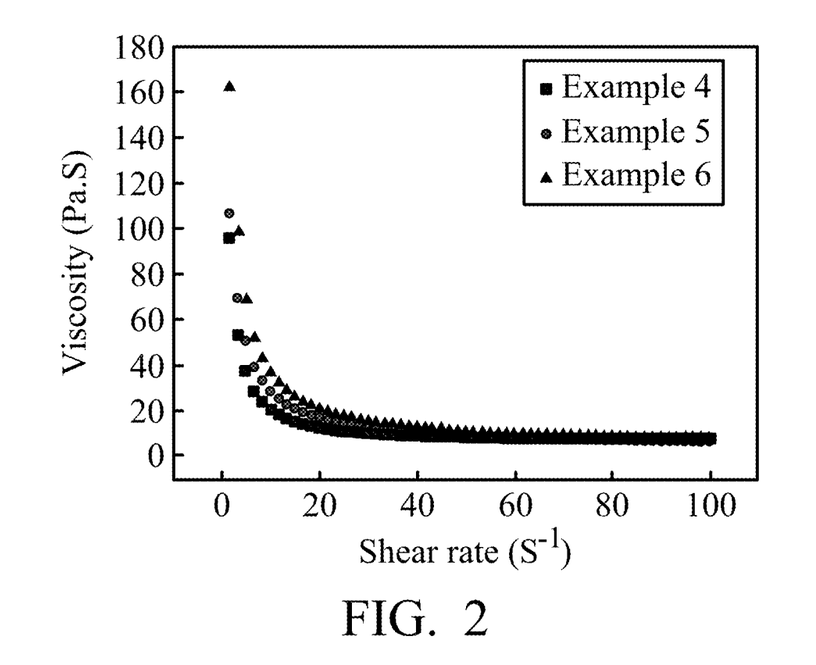
FIG. 2 is a graph plotting the viscosity of the carbon paste against shear rate according to some Examples of the disclosure.
Figure 3:
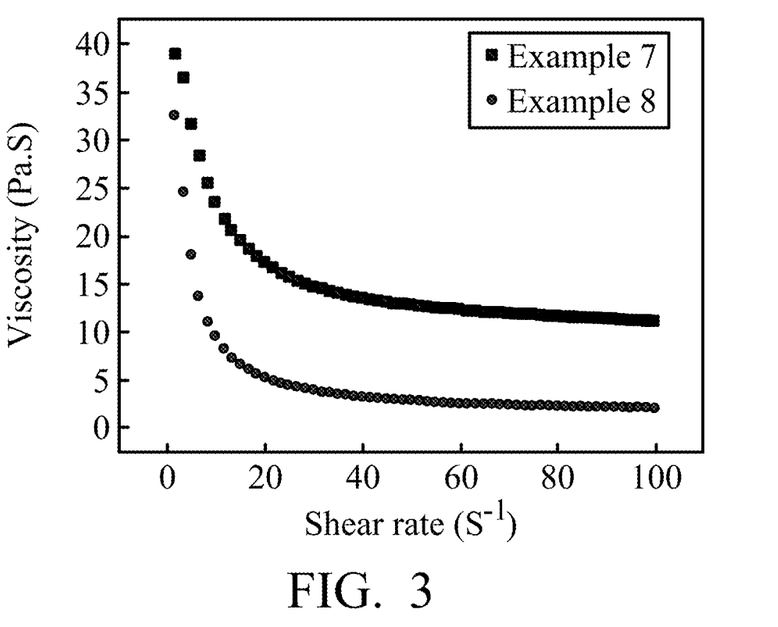
FIG. 3 is a graph plotting the viscosity of the carbon paste against shear rate according to other Examples of the disclosure.
Figure 4:
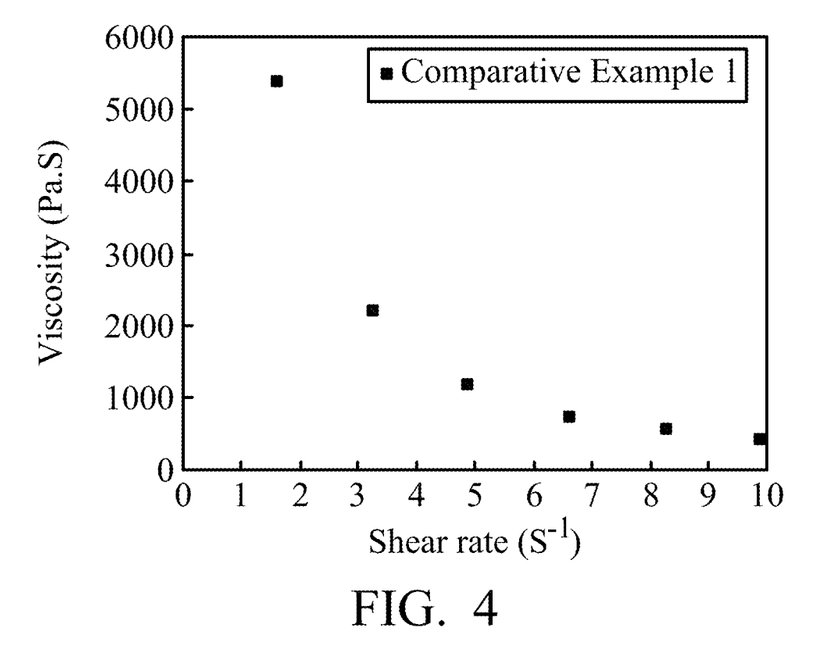
FIG. 4 is a graph plotting the viscosity of the carbon paste against shear rate according to Comparative examples of the disclosure.
Figure 5:
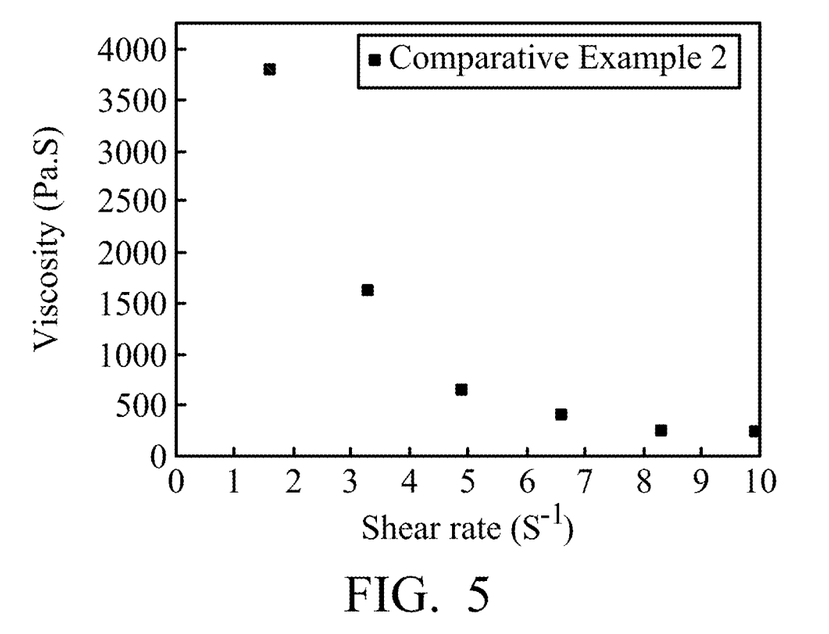
FIG. 5 is a graph plotting the viscosity of the carbon paste against shear rate according to some Comparative examples of the disclosure.
Figure 6:
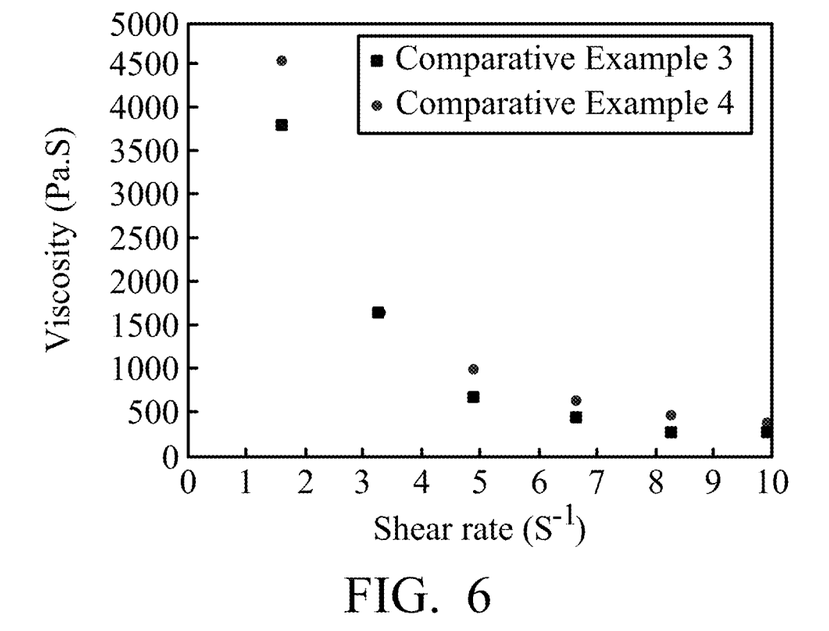
FIG. 6 is a graph plotting the viscosity of the carbon paste against shear rate according to other Comparative examples of the disclosure.

Due to the extremely poor mobility, the rheological graph of carbon paste of Comparative example 1 cannot be obtained at high shear rate. Thus, the viscosity of carbon paste of Comparative examples 1 was merely measured at the shear rate of 10 $S^{-1}$. Furthermore, Tables 1 and 2 only shown the viscosity measured at shear rates of 1.6 $S^{-1}$ and 9.9 $S^{-1}$.

As shown in Table 1, when the grafted SMA1000I of Examples 1-8 served as the dispersant, the viscosity of carbon paste at the shear rate of 9.9 $S^{-1}$ is reduced to less than 40 Pa·S, and the viscosity of carbon paste at the shear rate of 1.6 $S^{-1}$ is reduced to less than 170 Pa·S. On the contrary, when the non-grafting SMA1000I of Comparative examples 1-4 served as the dispersant, the viscosity of carbon paste at the shear rate of 9.9 $S^{-1}$ is greater than 230 Pa·S, and the viscosity of carbon paste at the shear rate of 1.6 $S^{-1}$ is greater than 3700 Pa·S.

Thus, the carbon pastes of Comparative examples 1-4 do not exhibit any mobility due to the high viscosity. When performing a screen-printing process with the carbon pastes of Comparative examples 1-4, the carbon pastes would stick to the blade resulting in a failure to ink, obtaining an uneven film surface after the screen-printing.

On the contrary, when performing a screen-printing process with the carbon pastes of Examples 1-8, the carbon pastes would not stick to the blade and can serve as ink. Thus, an even film surface is obtained after the screen-printing.

TI value means thixotropic index, which is used to determine whether the carbon paste is suitable for use in screen-printing process or not. When TI value is between 2 and 6, it means the carbon paste is suitable for use in screen-printing process. Otherwise, the carbon paste is not suitable for use in screen-printing process when TI value is out the aforementioned range.

Preparation and Characteristic Measurement of Carbon Film

The carbon pastes of Examples 1-8 and Comparative Examples 1-4 were coated to a bakelite substrate by screen-printing, and then cured by photo-curing to form carbon films.

The adhesion of the carbon films was measured in accordance with ASTM D3359. The results are shown in Tables 1 and 2. The adhesion grades from 5B to 0B are arranged from more to less preferred. After measurement, the adhesion grade of the carbon films of Comparative Examples 1-4 is 0B, since the carbon pastes of Comparative Examples 1-4 exhibit poor dispersibility. On the contrary, the adhesion grade of the carbon films of Examples 1-8 is 5B, since the carbon pastes of Examples 1-8 exhibit superior dispersibility.

TABLE 1

| Example | SMA1000I (g) | monomer species | weight (g) | ITX (g) | BCA (g) | resin species | weight (g) | carbon material species | weight (g) | viscosity at shear rate of 1.6 $S^{-1}$ (Pa·S) | viscosity at shear rate of 9.9 $S^{-1}$ (Pa·S) | TI value | Adhesion |
|---|---|---|---|---|---|---|---|---|---|---|---|---|---|
| 1 | 1.89 | 512AS | 0.32 | 0.19 | 7 | acrylic resin | 4.10 | KS6 XE-2B | 3.5 | 6.054 | 4.429 | 1.41 | 5B |
| 2 | 0.95 | 512AS | 1.26 | 0.19 | 7 | acrylic resin | 4.10 | KS6 XE-2B | 3.5 | 8.601 | 5.867 | 1.5 | 5B |
| 3 | 0.63 | 512AS | 1.58 | 0.19 | 7 | acrylic resin | 4.10 | KS6 XE-2B | 3.5 | 36.52 | 12.18 | 3.15 | 5B |

TABLE 1-continued

| Example | SMA1000I (g) | monomer species | weight (g) | ITX (g) | BCA (g) | resin species | weight (g) | carbon material species | weight (g) | viscosity at shear rate of 1.6 S$^{-1}$ (Pa·S) | viscosity at shear rate of 9.9 S$^{-1}$ (Pa·S) | TI value | Adhesion |
|---|---|---|---|---|---|---|---|---|---|---|---|---|---|
| 4 | 3.79 | 512AS | 0.63 | 0.19 | 7 | acrylic resin | 1.89 | KS6 XE-2B | 3.5 | 96.46 | 21.09 | 4.94 | 5B |
| 5 | 1.89 | 512AS | 2.52 | 0.19 | 7 | acrylic resin | 1.89 | KS6 XE-2B | 3.5 | 107.3 | 29.11 | 3.92 | 5B |
| 6 | 1.26 | 512AS | 3.16 | 0.19 | 7 | acrylic resin | 1.89 | KS6 XE-2B | 3.5 | 162.7 | 37.38 | 4.66 | 5B |
| 7 | 0.95 | 102 | 1.26 | 0.19 | 7 | acrylic resin | 4.10 | KS6 XE-2B | 3.5 | 32.42 | 9.319 | 3.63 | 5B |
| 8 | 1.89 | 102 | 2.52 | 0.19 | 7 | epoxy resin | 1.89 | KS6 XE-2B | 3.5 | 38.86 | 23.43 | 1.68 | 5B |

TABLE 2

| Comparative example | SMA1000I (g) | monomer species | weight (g) | ITX (g) | BCA (g) | resin species | weight (g) | carbon material species | weight (g) | viscosity at shear rate of 1.6 S$^{-1}$ (Pa·S) | viscosity at shear rate of 9.9 S$^{-1}$ (Pa·S) | TI value | Adhesion |
|---|---|---|---|---|---|---|---|---|---|---|---|---|---|
| 1 | 0.76 | 512AS | 1.26 | 0.19 | 7 | acrylic resin | 4.10 | KS6 XE-2B | 3.5 | 5364 | 420.4 | 14.14 | 0B |
| 2 | 1.89 | 512AS | 2.52 | 0.19 | 7 | acrylic resin | 1.89 | KS6 XE-2B | 3.5 | 3792 | 235.7 | 17.78 | 0B |
| 3 | 0.95 | 102 | 1.26 | 0.19 | 7 | epoxy resin | 4.10 | KS6 XE-2B | 3.5 | 3792 | 235.7 | 17.78 | 0B |
| 4 | 1.89 | 102 | 2.52 | 0.19 | 7 | epoxy resin | 1.89 | KS6 XE-2B | 3.5 | 4534 | 338.9 | 14.95 | 0B |

[Note]
SMA1000I: styrene-maleimide copolymer
512AS: dicyclopentenyloxyethyl acrylate
102: 3-ethyl-3-(methacryloyloxy)methyloxetane
ITX: isopropylthioxanthone
BCA: butyl carbitol acetate
KS6: graphite
XE-2B: carbon black It will be clear that various modifications and variations can be made to the disclosed methods and materials. It is intended that the specification and examples be considered as exemplary only, with the true scope of the disclosure being indicated by the following claims.

What is claimed is:

1. A modified copolymer, which is a random copolymer comprising a repeat unit of Formula (I) and a repeat unit of Formula (II)

(I)

(II)

wherein M is derived from monomers with double bonds, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups, m and x are positive integers less than 50, and the modified copolymer has a weight average molecular weight between 3000 and 30000.

2. The modified copolymer as claimed in claim 1, wherein the random copolymer further comprises a repeat unit of Formula (III) and/or a repeat unit of Formula (IV),

(III)

(IV)

wherein M is derived from monomers with double bonds, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups; and m, y, z, and n are independently a positive integer less than 50.

3. The modified copolymer as claimed in claim 2, wherein the repeat unit of Formula (I), the repeat unit of Formula (II), the repeat unit of Formula (III), and/or the repeat unit of Formula (IV) are arranged in a random fashion.

4. The modified copolymer as claimed in claim 1, wherein M is a repeat unit of Formula (VI) which is derived from a monomer of Formula (VII):

(VI)

(VII)

wherein $R^8$, $R^9$, $R^{10}$ and $R^{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)O$R_3$, —C(=O)NH$R_4$, —O$R_5$, —NH$R_6$, —$R_7$COOH, or one of $R_8$ and $R_9$ and one of $R_{10}$ and $R_{11}$ link together with the carbon atoms to which $R_8$, $R_9$, $R_{10}$, and $R_{11}$ are attached to form $C_5$-$C_{12}$ cycloalkyl group or cycloalkenyl group; wherein $R_3$, $R_4$, $R_5$ or $R_6$ are independently hydrogen, straight or branched $C_1$-$C_{12}$ alkyl group, $C_5$-$C_{12}$ cycloalkyl group, $C_2$-$C_8$ alkoxy group, $C_6$-$C_{12}$ aryl group, or a combination thereof; $R_7$ is straight or branched $C_1$-$C_{12}$ alkyl group, or straight or branched $C_1$-$C_{12}$ alkoxy group.

5. The modified copolymer as claimed in claim 4, wherein one of $R^8$, $R^9$, $R^{10}$, and $R^{11}$ is dicyclopentadienyl group, oxetanyl group, or a derivative thereof.

6. The modified copolymer as claimed in claim 4, wherein $R_3$, $R_4$, $R_5$ or $R_6$ is wherein $R_{12}$ is hydrogen, straight or branched $C_1$-$C_{12}$ alkyl group, straight or branched $C_1$-$C_{12}$ alkoxy group, or straight or branched $C_1$-$C_{12}$ alkylamine group; p is an integer from 1 to 12; $R_{16}$ is straight or branched $C_1$-$C_{12}$ alkyl group; $R_{17}$ is hydrogen, straight or branched $C_1$-$C_{12}$ alkyl group; and d is an integer from 1 to 600.

7. The modified copolymer as claimed in claim 4, wherein the monomer comprises dicyclopentenyloxyethyl acrylate, 3-ethyl-3-(methacryloyloxy)methyloxetane, 3,4-epoxycyclohexylmethyl acrylate, alkoxylated lauryl acrylate, 2-(2-ethoxyethoxy)ethyl acrylate, tetrahydrofurfuryl acrylate, lauryl acrylate, isodecyl acrylate, 3,3,5-trimethylcyclohexyl acrylate, isobornyl acrylate, isooctyl acrylate, tridecyl acrylate, cyclic trimethylolpropane formal acrylate, 2-hydroxyethyl acrylate, 2-ethylhexyl acrylate, vinylpyrrolidone, or a combination thereof.

8. The modified copolymer as claimed in claim 1, wherein R is straight or branched $C_1$-$C_{12}$ alkyl group, cycloalkyl group, straight or branched alkoxy group, straight or branched acyl group, aryl group, straight or branched nitroalkyl group, ether group, ester group, keto group, azo group, or a combination thereof.

9. The modified copolymer as claimed in claim 1, wherein R is —$R_{13}$—$(CH_2)_p$—, —$R_{14}$—O—$(CH_2)_p$—, —$R_{15}$—N—$(CH_2)_p$—, wherein $R_{13}$, $R_{14}$, and $R_{15}$ are independently straight or branched $C_1$-$C_{12}$ alkyl group, cycloalkyl group, phenyl group, benzyl group, imidazol group, benzimidazol group, 1,3,4-thiadiazole group, or pyridine group; and p is 0 or an integer from 1 to 12.

10. A method for preparing a modified copolymer, comprising:
mixing a copolymer of Formula (V), a monomer having a double bond, an initiator, and a solvent to form a prepolymer; and
irradiating the prepolymer with an ultraviolet light to undergo a grafting reaction, wherein the weight ratio of the copolymer of Formula (V) to the monomer is from 6:1 to 1:6, (V)

wherein a is a positive integer less than 50, b is an integer from 5 to 25, R is a direct bond or an aliphatic hydrocarbon chain group having 1 to 12 carbon atoms, a cyclic aliphatic hydrocarbon group having 3 to 16 carbon atoms, an alkylcarbonyloxy group having 2 to 6 carbon atoms, a carbonyl group, an ether group, an ester group, an amide group, an aromatic group having 6 to 16 carbon atoms, or a divalent group having any of the above groups, and the copolymer of formula (V) has a weight average molecular weight between 2000 and 6000.

11. The method as claimed in claim 10, wherein the monomer having a double bond has a structure represented by Formula (VII):

(VII)

wherein $R_8$, $R_9$, $R_{10}$ and $R_{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)O$R_3$, —C(=O)NH$R_4$, —O$R_5$, —NH$R_6$, —$R_7$COOH, or one of $R_8$ and $R_9$ and one of $R_{10}$ and $R_{11}$ link together with the carbon atoms to which $R_8$, $R_9$, $R_{10}$, and $R_{11}$ are attached to form $C_5$-$C_{12}$ cycloalkyl group or cycloalkenyl group; wherein $R_3$, $R_4$, $R_5$ or $R_6$ are independently hydrogen, straight or branched $C_1$-$C_{12}$ alkyl group, $C_5$-$C_{12}$ cycloalkyl group, $C_2$-$C_8$ alkoxy group, $C_6$-$C_{12}$ aryl group or a combination thereof and $R_7$ is straight or branched $C_1$-$C_{12}$ alkyl group or straight or branched $C_1$-$C_{12}$ alkoxy group.

12. The method as claimed in claim 11, wherein one of $R_8$, $R_9$, $R_{10}$, and $R_{11}$ is dicyclopentadienyl group, oxetanyl group, or a derivative thereof.

13. The method as claimed in claim 11, wherein $R_3$, $R_4$, $R_5$ or $R_6$ is selected from the group consisting of wherein $R_{12}$ is hydrogen, straight or branched $C_1$-$C_{12}$ alkyl group, straight or branched $C_1$-$C_{12}$ alkoxy group, or straight or branched $C_1$-$C_{12}$ alkylamine group; p is an integer from 1 to 12; $R_{16}$ is straight or branched $C_1$-$C_{12}$ alkyl group; $R_{17}$ is hydrogen, straight or branched $C_1$-$C_{12}$ alkyl group; and d is an integer from 1 to 600.

14. The method as claimed in claim 11, wherein the monomer comprises dicyclopentenyloxyethyl acrylate, 3-ethyl-3-(methacryloyloxy)methyloxetane, 3,4-epoxycyclohexylmethyl acrylate, alkoxylated lauryl acrylate, 2-(2-ethoxyethoxy) ethyl acrylate, tetrahydrofurfuryl acrylate, lauryl acrylate, isodecyl acrylate, 3,3,5-trimethylcyclohexyl acrylate, isobornyl acrylate, isooctyl acrylate, tridecyl acrylate, cyclic trimethylolpropane formal acrylate, 2-hydroxyethyl acrylate, 2-ethylhexyl acrylate, vinylpyrrolidone, or a combination thereof.

15. The method as claimed in claim 10, wherein R is straight or branched $C_1$-$C_{12}$ alkyl group, cycloalkyl group, straight or branched alkoxy group, straight or branched acyl group, aryl group, straight or branched nitroalkyl group, ether group, ester group, keto group, azo group, or a combination thereof.

16. The method as claimed in claim 10, wherein R is —$R_{13}$—(CH$_2$)$_p$—, —$R_{14}$—O—(CH$_2$)$_p$—, —$R_{15}$—N—(CH$_2$)$_p$—, wherein $R_{13}$, $R_{14}$, and $R_{15}$ are independently $C_1$-$C_{12}$ straight or branched alkyl group, cycloalkyl group, phenyl group, benzyl group, imidazol group, benzimidazol group, 1,3,4-thiadiazole group, or pyridine group; and p is 0 or an integer from 1 to 12.

17. The method as claimed in claim 10, wherein the initiator comprises an azo compound, peroxide compound, Type II photoinitiator, or a combination thereof.

18. A method for preparing a paste, comprising:
mixing the modified copolymer prepared from the method as claimed in claim 17, a compound with a double bond or a polymer with a double bond, and a carbon material to form a paste, wherein the weight ratio of the modified copolymer to the compound with a double bond or the polymer with a double bond is from 9:1 to 1:9.

19. The method as claimed in claim 18, wherein the amount of the modified copolymer is 100 parts by weight, the amount of the compound with a double bond or the polymer with a double bond is 100-900 parts by weight, and the amount of the carbon material is 1-1000 parts by weight.

20. The method as claimed in claim 18, wherein the compound with a double bond has a structure represented by Formula (VII)

(VII)

wherein $R_8$, $R_9$, $R_{10}$ and $R_{11}$ are independently hydrogen, straight or branched $C_1$-$C_{12}$ alkyl group or straight or branched $C_1$-$C_{12}$ alkoxy group, straight or branched $C_1$-$C_{12}$ alkylamine group, $C_5$-$C_{12}$ cycloalkyl group, $C_2$-$C_8$ epoxy group, $C_2$-$C_8$ nitrocyclic group, $C_6$-$C_{12}$ aryl group, —C(=O)O$R_3$, —C(=O)NH$R_4$, —O$R_5$, —NH$R_6$, —$R_7$COOH, or one of $R_8$ and $R_9$ and one of $R_{10}$ and $R_{11}$ link together with the carbon atoms to which $R_8$, $R_9$, $R_{10}$, and $R_{11}$ are attached to form $C_5$-$C_{12}$ cycloalkyl group or cycloalkenyl group, wherein $R_3$, $R_4$, $R_5$ or $R_6$ are independently hydrogen, straight or branched $C_1$-$C_{12}$ alkyl group, $C_5$-$C_{12}$ cycloalkyl group, $C_2$-$C_8$ epoxy group, $C_6$-$C_{12}$ aryl group or a combination thereof, $R_7$ is straight or branched $C_1$-$C_{12}$ alkyl group, or straight or branched $C_1$-$C_{12}$ alkoxy group.

21. The method as claimed in claim 18, wherein one of $R_8$, $R_9$, $R_{10}$, and $R_{11}$ is dicyclopentadienyl group, oxetanyl group, or a derivative thereof.

22. The method as claimed in claim 18, wherein the $R_3$, $R_4$, $R_5$ or $R_6$ is selected from the group consisting of -continued wherein $R_{12}$ is hydrogen, straight or branched $C_1$-$C_{12}$ alkyl group, straight or branched $C_1$-$C_{12}$ alkoxy group, or straight or branched $C_1$-$C_{12}$ alkylamine group; p is an integer from 1 to 12; $R_{16}$ is straight or branched $C_1$-$C_{12}$ alkyl group; $R_{17}$ is hydrogen, straight or branched $C_1$-$C_{12}$ alkyl group; and d is an integer from 1 to 600.

23. The method as claimed in claim 18, wherein the compound with a double bond comprises dicyclopentenyloxyethyl acrylate, 3-ethyl-3-(methacryloyloxy)methyloxetane, 3,4-epoxycyclohexylmethyl acrylate, methoxy polyethylene glycol monoacrylate, alkoxylated lauryl acrylate, 2-(2-ethoxyethoxy) ethyl acrylate, tetrahydrofurfuryl acrylate, lauryl acrylate, isodecyl acrylate, 3,3,5-trimethylcyclohexyl acrylate, isobornyl acrylate, isooctyl acrylate, tridecyl acrylate, cyclic trimethylolpropane formal acrylate, 2-hydroxyethyl acrylate, 2-ethylhexyl acrylate, vinylpyrrolidone, or a combination thereof.

24. The method as claimed in claim 18, wherein the polymer with a double bond comprises acrylic resin, polyester resin, fluorocarbon resin, polyamide resin, polyimide resin, polyether resin, epoxy resin, polyurethane resin, polystyrene resin, polyvinyl butyral resin, silicone resin, phenoxy resin, urea resin, acrylonitrile-butadiene-styrene resin, polyacrylate resin, or a combination thereof.

25. The method as claimed in claim 18, wherein the carbon material comprises carbon black, graphite, vapor-grown carbon fiber, graphene, or a combination thereof.

* * * * *